J. WISNIEWSKI.
PROSPECTING MACHINE.
APPLICATION FILED MAR. 2, 1916.

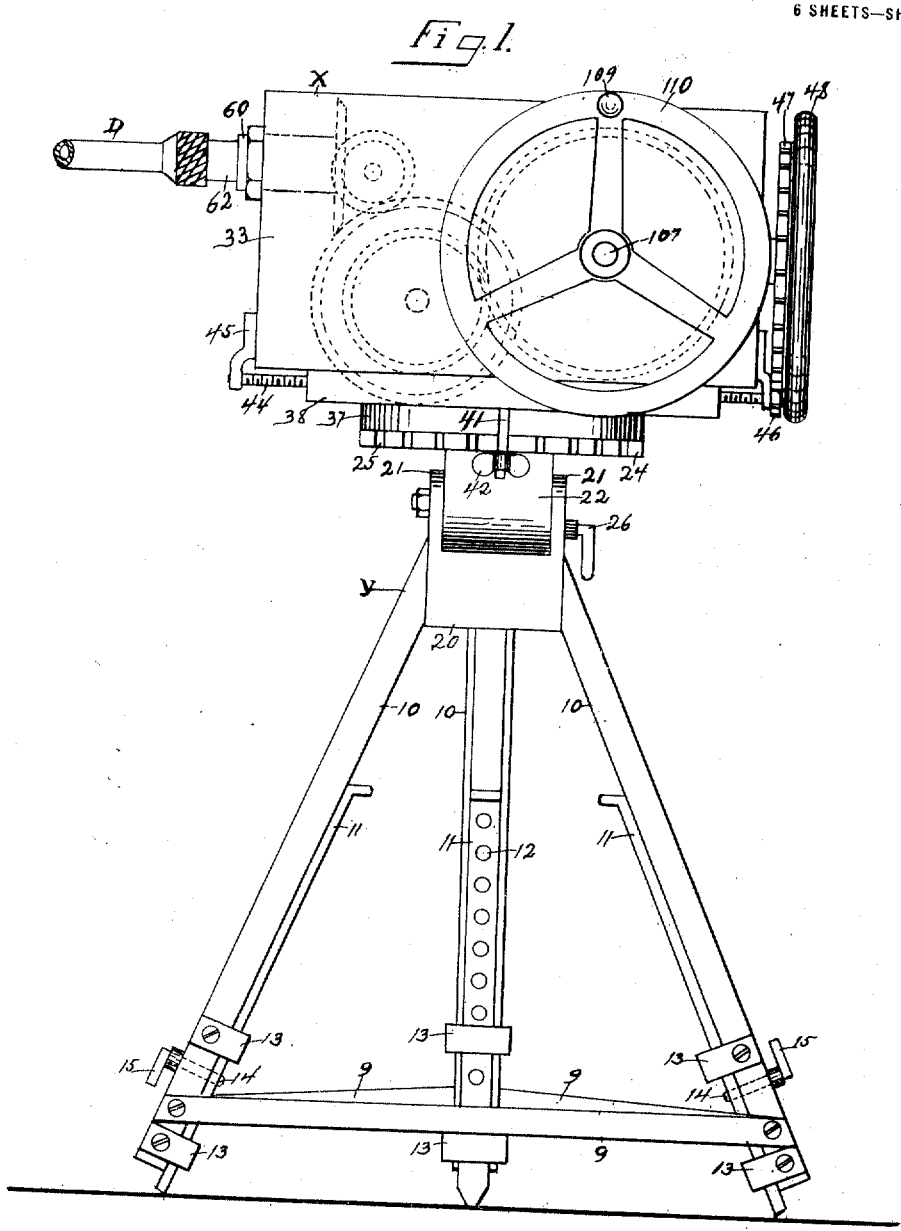

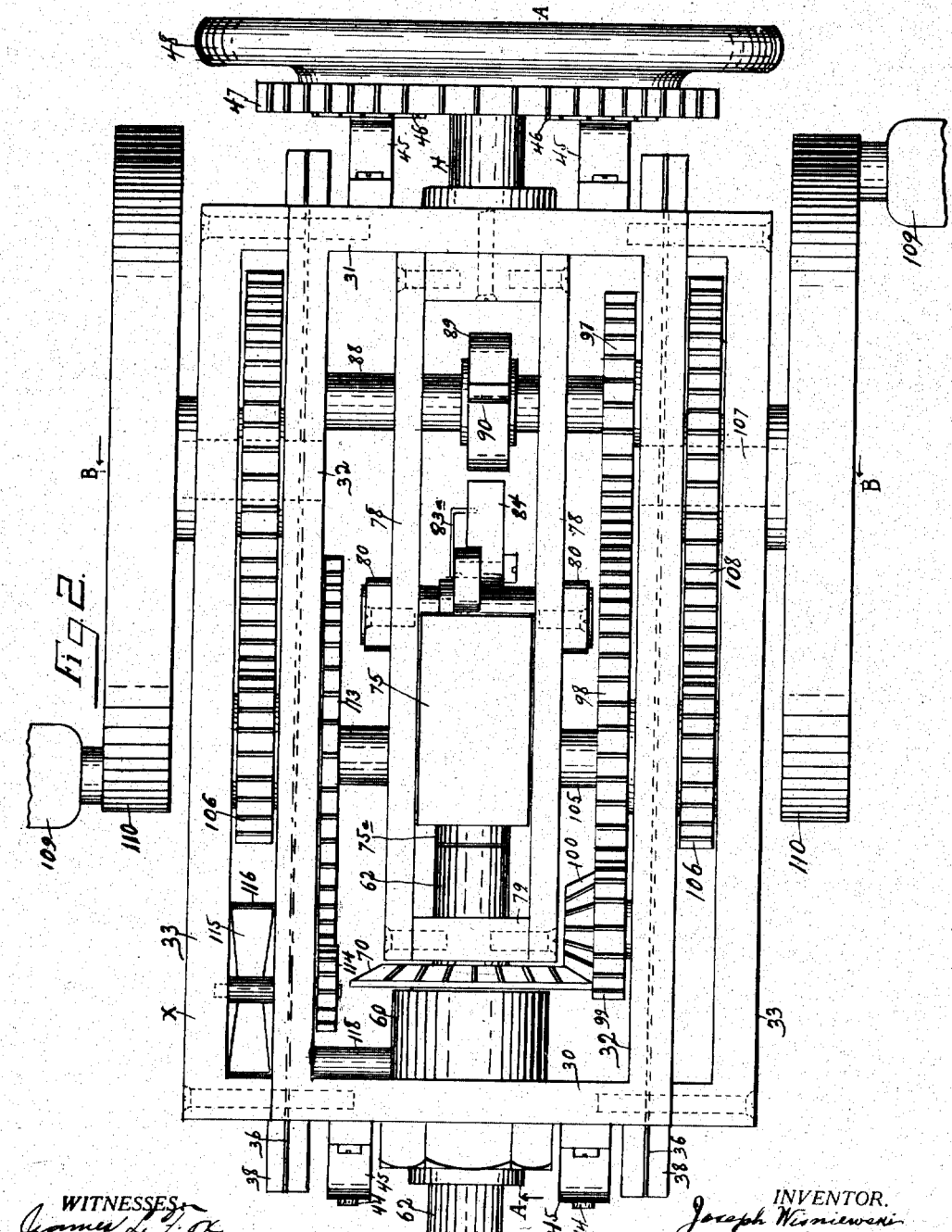

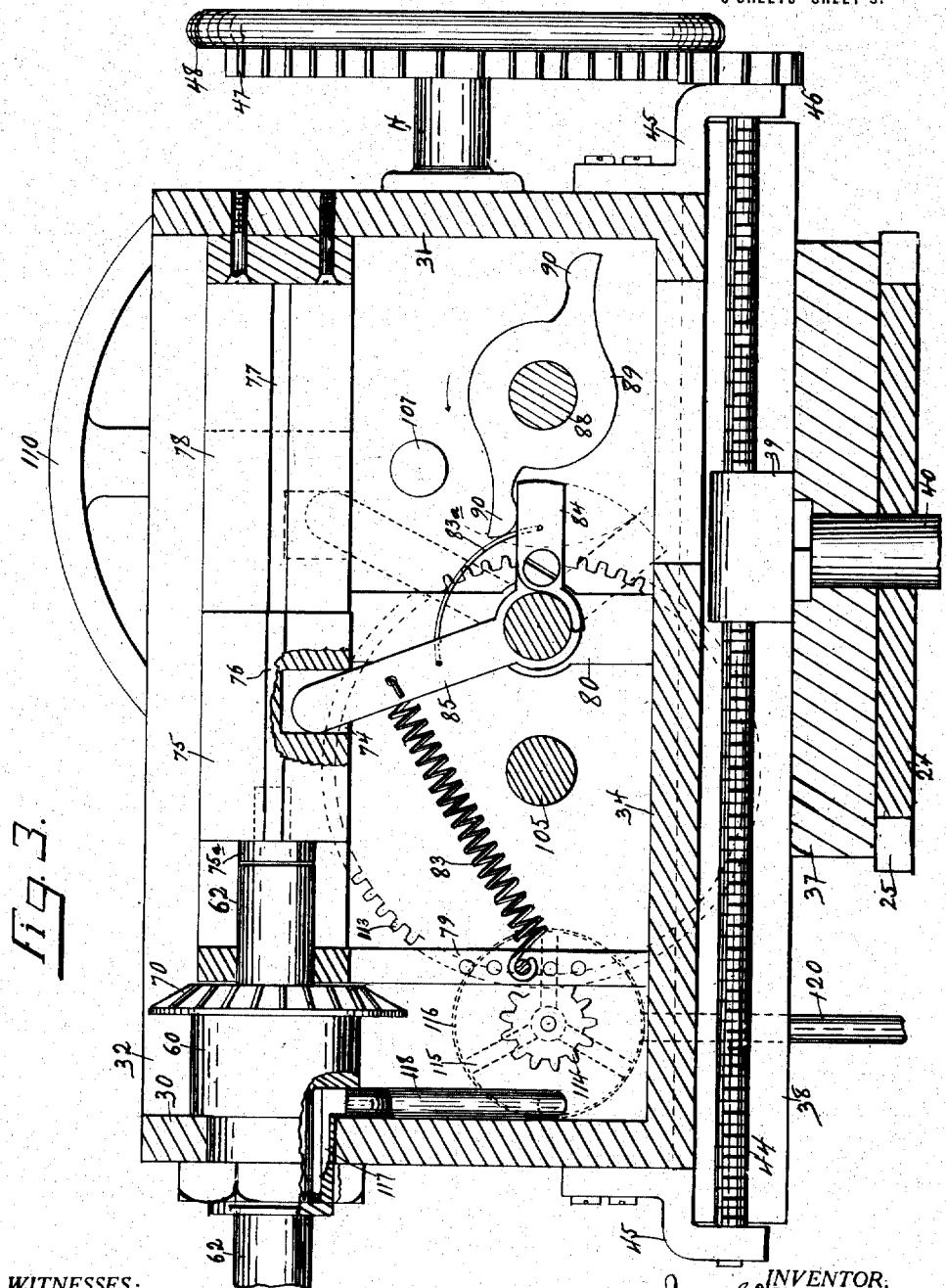

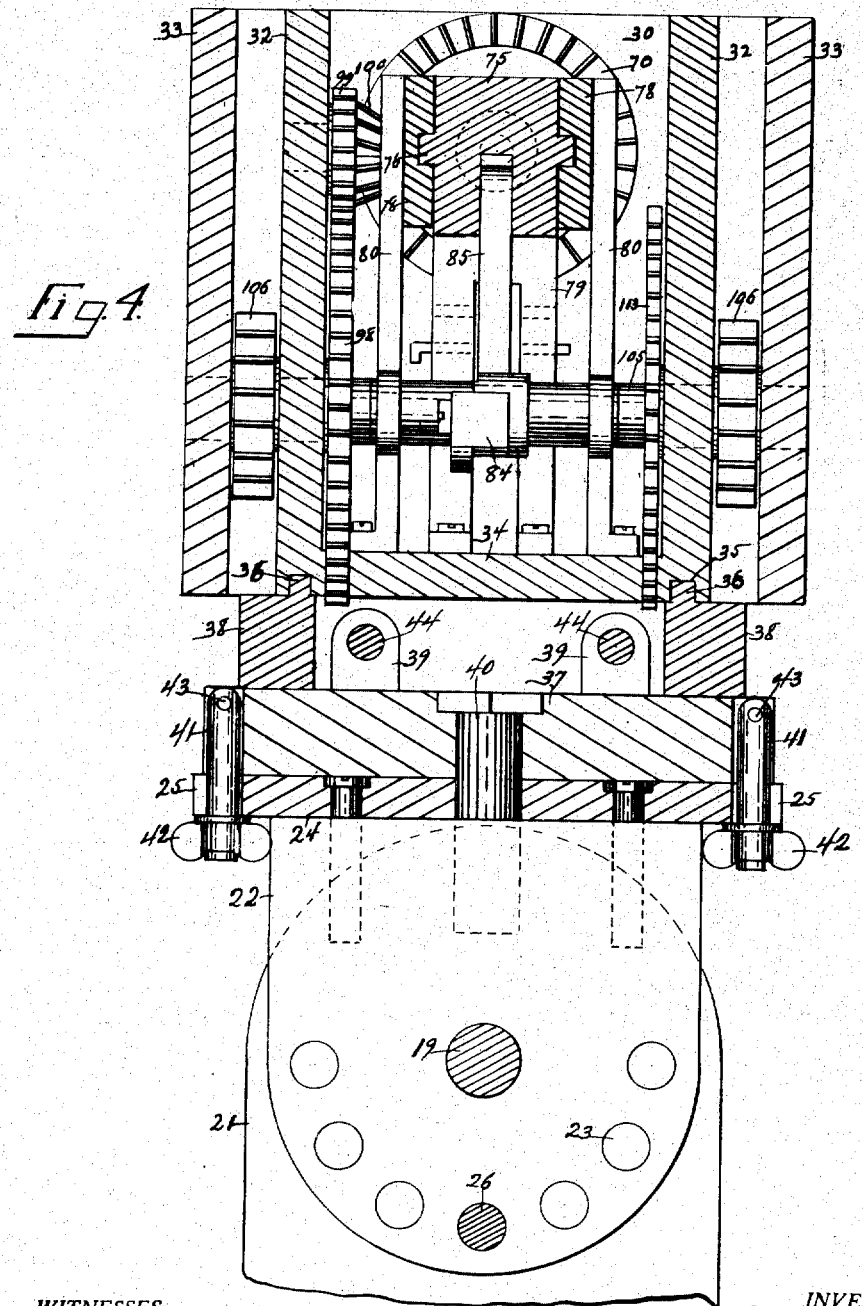

1,227,865.

Patented May 29, 1917.
6 SHEETS—SHEET 5.

WITNESSES
James K. Fox
M. Watson

INVENTOR.
Joseph Wisniewski
BY Chas. A. Lakefish,
His ATTORNEY.

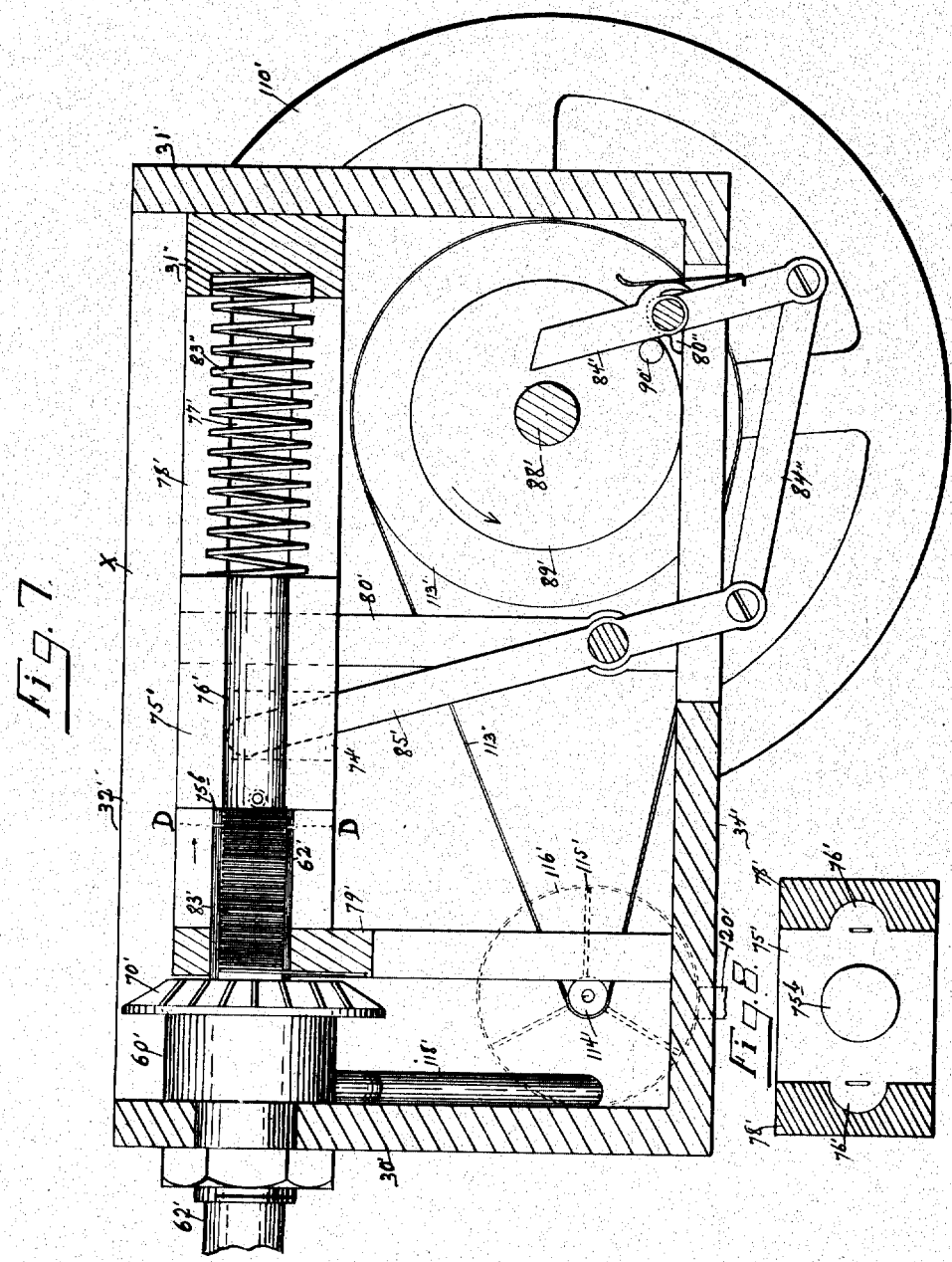

UNITED STATES PATENT OFFICE.

JOSEPH WISNIEWSKI, OF BUTTE, MONTANA.

PROSPECTING-MACHINE.

1,227,865.   Specification of Letters Patent.   Patented May 29, 1917.

Application filed March 2, 1916. Serial No. 81,628.

*To all whom it may concern:*

Be it known that I, JOSEPH WISNIEWSKI, a subject of the Emperor of Germany, residing at Butte, in the county of Silverbow and State of Montana, have invented a new and useful Prospecting-Machine, of which the following is a specification.

The invention herein enunciated relates to improvements in prospecting machines in which a tubular drill is driven into the prospected rock or stratum by a percussion hammer and the loosened dust is drawn through the tubular drill and hollow drill-holding spindle by a rotary fan.

The cost of the steam and electric power actuated prospecting machines now in operation and the expense of one of these machines in operation are so great that numerous prospectors have to resort to the drill-and-hammer process in their prospecting operations. The use of the drill-and-hammer process consumes time and labor to such an extent that many prospectors find themselves prematurely compelled to abandon their endeavors. The principal object of the present invention is to produce a comparatively simple and inexpensive prospecting machine in which the tubular drill is driven into the rock or stratum by a spring-impelled percussion hammer in rapid succession by means of a tripping mechanism so constructed and arranged as to be operated by the combined action of the hand and momentum of a pair of heavy fly wheels. Another important object of the present invention is to produce a prospecting machine in which the drill-holding spindle containing head shall be capable of swiveling, of being moved horizontally to and from the rock prospected upon, and be adjustable vertically and angularly. Still another important object of the present invention is to arrange a rotary fan in such a manner as draw the dust from the hollow drill-holding spindle with ease and facility. The other objects of the present invention will appear in the body of the specification.

These objects I attain by the construction and arrangement of the parts and mechanisms illustrated in the accompanying drawings, in which—

Figure 6:
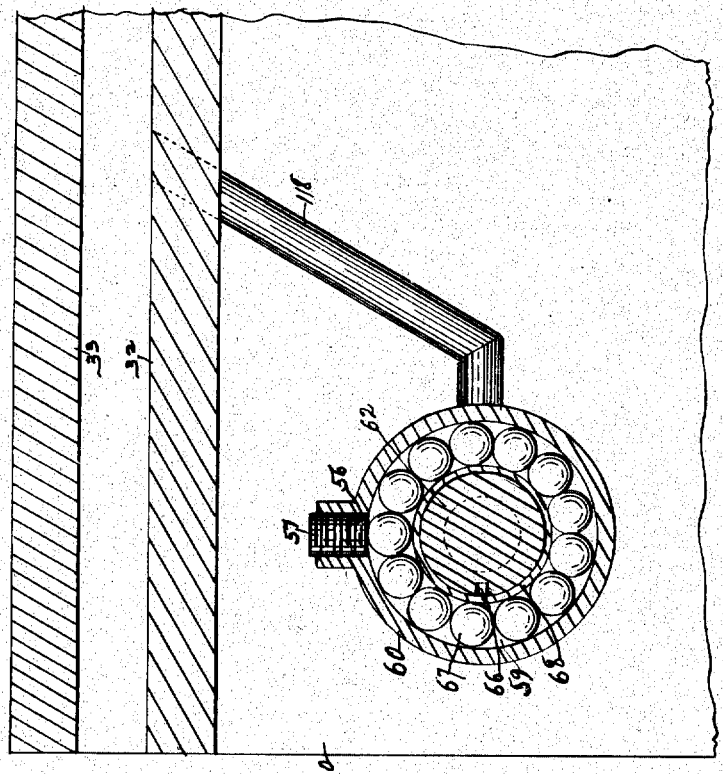
Figure 5:
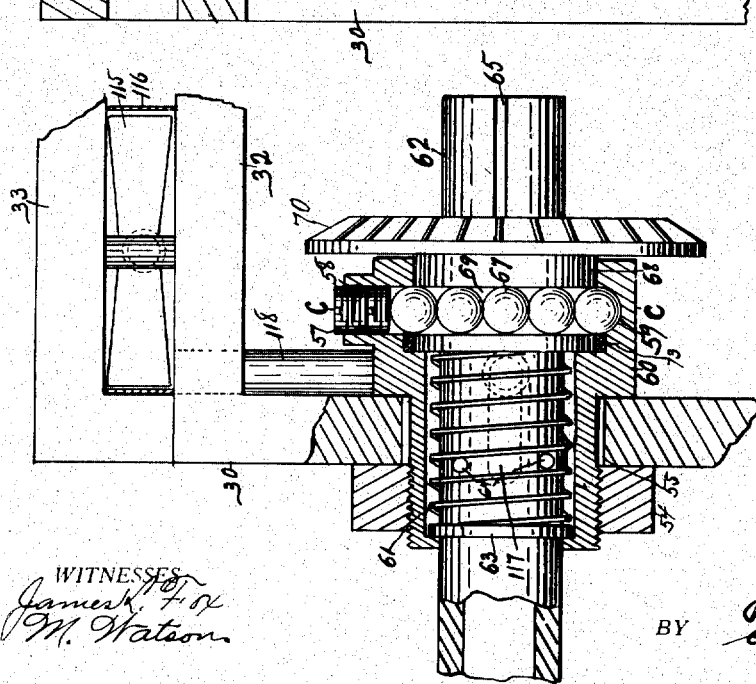

Figure 1 is a side elevation of my prospecting machine as it appears when the parts are assembled and set up ready for operation;

Fig. 2, an enlarged top view of the works-containing head;

Fig. 3, a section on the line A—A of Fig. 2, looking in the direction of the arrow head;

Fig. 4, a section on the line B—B of Fig. 2, looking in the direction of the arrow head;

Fig. 5, a broken out part of the front and right-hand side walls of the works-containing head, showing the spindle-containing sleeve in horizontal section;

Fig. 6, a face view of the inner side of the front wall, showing the spindle-containing sleeve in cross section on the line C—C of Fig. 5;

Fig. 7, a view similar to Fig. 3, showing a modified construction of the tripping mechanism and provision for greater spring-impelling power;

Fig. 8, a section on the line D—D of Fig. 7.

Similar numerals and character of reference denote corresponding parts throughout the several views.

In constructing my prospecting machine, the box-like works-containing head X is mounted upon a tripod Y each leg 10 of which is provided with a long bar 11 having a plurality of screw-threaded holes 12 about in the middle of its width. The said bar is held to the leg slidable vertically by means of bands 13 and rigidly by means of a bolt 14 which, for convenience of manipulation, is provided with a handle 15. The said handle may be formed integrally with the bolt by simply lengthening its unthreaded end and bending the same at right angles, as shown in Fig. 1. After the bar 11 is adjusted to the desired length the bolt 14 is screwed into the hole 12 registering therewith. By this means the head X may be adjusted vertically to various heights and securely fastened in the adjusted position.

The upper ends of the legs 10 are rigidly secured to a block 20 provided with oppositely disposed, upwardly extending ears 21. In the space between the two ears 21 is mounted rockably a block 22 having, preferably in its lower end—Fig. 4, segmentally arranged holes 23 and carrying on its upper end a concentrically-bored circular disk 24—Fig. 3—provided with notches 25 in its periphery. A bolt 26, the free end of which is preferably similarly lengthened and bent at right angles, passes through the ears 21 and one of the holes 23 in the block 22, as clearly shown in Fig. 1. By means of this arrangement the head X, seated upon the disk 24, may be tilted forward or backward various degrees and by inserting the bolt 26 through the hole 23 registering therewith securely locked in the tilted position.

The head X, which carried the working mechanism, consists of an elongated rectangular box having a front wall 30, a back wall 31, double side walls 32 and 33, and a bottom 34. In the said bottom are grooves 35 coursing along, preferably directly underneath, the opposite side walls 32, as shown in Fig. 4. A block 37, carrying rails 38 provided with ribs 36 adapted to the grooves 35, and having a pair of screw-threaded nuts 39 secured thereto in the space between the said rails, a king bolt 40 in the space between the said two nuts and bolts 41, provided with preferably winged nuts 42 the upper end of which are hinged at 43, is held to the said box or head X by screw-threaded rods 44 lodged in the nuts 42. The said rods are mounted rotatably in brackets 45, as clearly shown in Figs. 2 and 3. By means of the bolt 40 lodging in the bore in the said centrally bored disk 24 the head X is made capable of swiveling bodily, and by inserting the bolts 41 into notches 25 in the said disk in the manner shown in Figs. 1 and 4 the said head is secured in the adjusted position.

Each of the screw-threaded rods 44 is provided with a pinion 46—Fig. 2. A hand wheel 48 carrying concentrically a gear 47 in mesh with the pinions 46 is held rotatably to the wall 31 of the head X, as shown in Figs. 2 and 3. By turning the hand wheel 48 the head X may be moved longitudinally forward or backward, and thus to or from the rock or stratum operated upon, approximately the length of the rods 44. It is understood that the said rods and nuts may be threaded any pitch deemed feasible and that the parts described may be proportioned in any manner deemed appropriate.

In the front wall 30, of the head X, is an opening 55 in which is rigidly secured a sleeve 60. The latter is bored out internally—Fig. 5—so as to receive a partly hollow drill-holding spindle 62 in its outer end and the hub 68 of a bevel gear 70 in its inner end and a spring 61 in the space between. By means of this construction the pressure exerted by the gear driving the gear 70 is effectually prevented from being communicated to the spindle 62 and from forcing the same against the opposite half of the inner periphery of the sleeve 66. The spindle 62 is provided with a collar 63, against which the said spring bears, and has a plurality of circumferentially arranged holes 64, communicating with its bore, and a longitudinal groove 65 in its solid end. The bevel gear 70 is provided with a key or feather 66 adapted to the groove 65 so that the said spindle and bevel gear rotate integrally and the former slide longitudinally in the latter. The drill D—Fig. 1— is to be a tubular one, otherwise it may be of any suitable construction—the well known diamond drill is at the present thought most appropriate—and held to the spindle 62 in any suitable manner.

As a most suitable means for holding the hub 68 of the gear 70 in the sleeve 60 rotatable freely, but snugly, and in position against lateral movement, a ball-race track 59 is formed in the sleeve 60 and a similar track 69 in the hub 68 in which tracks steel balls 67 are introduced through an opening 58 closed by, preferably two set screws 56 and 57, as clearly shown in Figs. 5 and 6. The gear 70 is thus held by the balls 67 both frictionlessly and against lateral movement. To prevent the ingress of dust into the ball-race track, a felt washer 73 may be introduced in the manner shown in Fig. 5.

Along a line coaxial with the spindle 62 is mounted a percussion hammer 75, so as to slide longitudinally. To reserve the side walls for the gears hereinafter described, the said hammer is preferably provided with ribs 76 on its sides and slides in the space between parallel bars 78 having grooves 77 adapted to the said ribs. The rear ends of the bars 78 are held to the back wall 31 and, for the purpose of providing means for holding a spring adjustable and a lever rockable without using the side walls, the bars 78 are supported from the bottom 34 at the front by a longitudinally slotted plate 79 and at a certain point near the middle by oppositely disposed uprights 80, as clearly shown in Figs. 2 and 3.

Between the uprights 80 is fulcrumed a bell-crank-like lever one end 85 of which rests in a pocket 74 made in the underside of the hammer 75 and the other end has a stub 84 mounted so as to rock thereon upwardly against the tension of a spring 83$^a$ and move integrally with the arm 85 when pressed downwardly, as clearly shown in Fig. 3. A spring 83 one end of which is fastened to the arm 85 and the other to the plate 79 holds the hammer 75 normally in contact with the end of the spindle 62 adjacent thereto. On a shaft 88, journaled between the opposite walls 32 of the head X, is rigidly secured the body 89 of a cam provided with, preferably diametrically opposite, trippets 90. When the shaft 88 is rotated the said trippets successively strike the upper surface of the stub 84 and the bearing down of the said stub causes the hammer 75 to move backward against the tension of the spring 83. The instant a trippet 90 leaves the stub 84 the hammer 75 returns to its normal position under the influence of the spring 83 and forcibly strikes the spindle 62. The hammer 75 is preferably provided with a steel head 75ª at its striking point, and the said trippets are shaped so as to secure quick release, all as clearly shown in Fig. 3. And thus the rapid rotation of the shaft 88 causes the hammer 75 to strike the spindle 62 in still more rapid succession. It is understood that the cam 89 may be provided with three or more trippets 90 in order to secure still greater rapidity of striking action. I prefer, however, to effect this result in the manner hereinafter described.

In order to impart rotary motion to the spindle 62 simultaneously with the striking of the hammer 75, the said spindle is operatively connected to the shaft 88 preferably in the following manner: On the shaft 88 is rigidly secured a spur toothed pinion 97. A spur-toothed pinion 99 carrying concentrically a bevel-toothed pinion 100, held in mesh with the bevel gear 70, is mounted upon a stud held in the wall 32 adjacent the pinion 97. A gear 98 in mesh with the pinions 97 and 99 transmits the motion of the former pinion to the latter. And thus on rotating the shaft 88 the spindle 62 is rotated simultaneously with the striking of the hammer 75. It is understood that if the cam 89 contains only two trippets 90 and the gear 97 be twice the diameter of pinion 99 and the bevel gear 70 twice the diameter of the latter, the spindle 62 will rotate one half of a revolution at every stroke of the hammer 75, and that these proportions may be varied as desired.

To be able to impart greater speed to the shaft 88, the latter is driven by the gear 98 and the said gear is further driven at a higher rate of speed preferably in the following manner: The gear 98 is mounted on a shaft 105, journaled in the opposite walls 32, carrying a pinion 106 at each extreme end thereof extending into the space between the walls 32 and 33, as clearly shown in Figs. 2 and 4. Axles 107, each of which carries a gear 108 in the space between the walls 32, 33 and a fly wheel 110, provided with a crank handle 109, beyond the wall 33, are journaled each in the double walls 32, 33 so that its gear is in mesh with the pinion 106. And thus on rotating either of the fly wheels 110 the gears 108 transmit increased rotary motion to the gear 98, and as the latter is of larger diameter than the pinions 97 and 99 the bevel gear 70 and the cam body 89 are driven at a still higher rate of speed. The spindle 62 is thus rotated and struck by the hammer 75 in rapid succession, while the fly wheels 110, being heavy and large in diameter, develop ample momentum and materially assist the manipulation of the machine.

The removal of the dust loosened by the tubular drill D is preferably effected by a rotary fan 115, journaled between the walls 32 and 33, contained in a shell 116, as shown in Fig. 2 and indicated by dotted lines in Fig. 3. In the sleeve is a chamber 117 communicating with the interior of the shell 116 by a tube or pipe 118 the extreme end of which is embedded in an opening in the wall 32 at the fan-axle bearing. The dust drawn by the said fan is discharged from the shell through a tube 120, which in practice empties into a vessel containing water. Referring particularly to Figs. 3 and 6 it will be observed that the fan 115 is situated at a point considerably below the level of the spindle 62, in consequence whereof the dust is drawn from a higher to a lower level and thus with greater facility. The fan 115 is preferably provided with a small pinion 114 in mesh with a large gear 113 on the shaft 105, as clearly shown in Fig. 3.

In the modification shown in Figs. 7 and 8 the percussion hammer 75' is provided with semi-circular ribs 76' and the parallel bars 78' with semi-circular grooves 77' in which the said hammer slides freely. The said semi-circular grooves serve as chambers for expansion springs 83' one end of each of which is held to the bars supporting plate 79' and the other to the hammer 75' as shown in Fig. 7. Between the hammer 75' and the back wall 31' is held a compression spring 83''. By this means the hammer 75' strikes the spindle 62' under the influence of the springs 83' and 83'' and thus with considerably greater force.

In this construction a disk 89' provided with a stud 90' is mounted upon a shaft 88', journaled between the walls 32', which transmits motion to the hammer 75' through the medium of a compound lever preferably composed of a straight lever 85' fulcrumed between uprights 80' the upper end of which rests in a pocket 74' in the underside of the hammer 75', a jointed lever 84' fulcrumed in ears 80'' rising from the bottom 34' of the head X', and a link 84'', as clearly shown in Fig. 7. The shaft 88' may be geared to the fly wheels 110' in the manner previously described in connection with the construction illustrated in Figs. 2, 3, and 4, or the fly wheel 110' may be mounted on the said shaft as shown. Similarly, the rotary fan 115' may be geared to the driving power in any suitable manner or belted to a wheel 113' on the shaft 88' as shown.

Reserving the right to make such changes and alterations in the general construction and arrangement of the parts herein shown and described as fairly fall within the spirit and scope of my invention, I claim—

1. The combination, in a prospecting machine, of a suitably supported head carrying a drill-holding spindle provided with a gear, a percussion hammer, a rotatable cam, a jointed lever between the said hammer and cam provided with a gear for converting the rotary motion of the latter into rectilinear movements of the former when the said cam is rotated in one direction and yield when rotated in opposite direction, a spring for controlling the jointed parts of the said lever, gears operatively connecting the said cam and spindle gears, manually operable means, and gears operatively connecting the latter to the first named gears.

2. The combination, in a prospecting machine, of a suitably-supported box-like head carrying a drill-holding spindle in its front wall, parallelly-disposed bars in the said head supported from its bottom by a pair of uprights, a percussion hammer supported slidably by the said bars, a lever rockable in one direction journaled between the said uprights, a spring-controlled arm on the said lever, a rotatable cam for rocking to the said lever journaled between the side walls of the said head, gears operatively connecting the said cam to the said spindle, and a manually-operable means for rotating the said gears.

3. The combination, in a prospecting machine, of a suitably-supported box-like head provided with double side walls, a drill-holding spindle provided with a gear held slidably in the front wall of the said head, a pinion in engagement with the said gear, a percussion hammer mounted slidably in the said head, means for imparting longitudinal movements to the said hammer comprising a rotary member provided with a gear and a lever constructed and arranged so as to be rocked thereby when the said member is rotated in one direction, the said lever being composed of two parts and a spring for restoring the same to their normal position when the said member is rotated in the opposite direction; a gear intermediate the latter gear and the said pinion, a manually-operable fly wheel, and gears in the space between the said double walls operatively connecting the said fly wheel to the said intermediate gear so as to accelerate its motion.

4. In a prospecting machine, a drill-holding spindle, a percussion hammer for striking the same provided with a pocket in its underside, and trip mechanism for operating the said hammer comprising a rotatable cam and a bell-crank-like lever one arm of which is lodged in the said pocket and the other is provided with a spring-controlled stub and means for rotating the said cam.

5. In a prospecting machine, a box-like works-containing head provided with a sleeve in its front wall, the said sleeve being recessed internally for the reception of a spring; a spring-pressed drill-holding spindle mounted rotatably and movable longitudinally in one end of the said sleeve, a gear splined on the said spindle provided with a circumferentially grooved hub and mounted rotatably in the opposite end of the said sleeve, and means in the said sleeve for engaging the said groove so as to hold the said gear non-movable longitudinally.

In testimony whereof I have hereunto affixed my signature in the presence of two subscribing witnesses this January, 1916.

JOSEPH WISNIEWSKI.

Witnesses:
JOSEPH DEMLECK,
ALBERT KOPANOSKI.

Copies of this patent may be obtained for five cents each, by addressing the "Commissioner of Patents, Washington, D. C."